Figure 1:
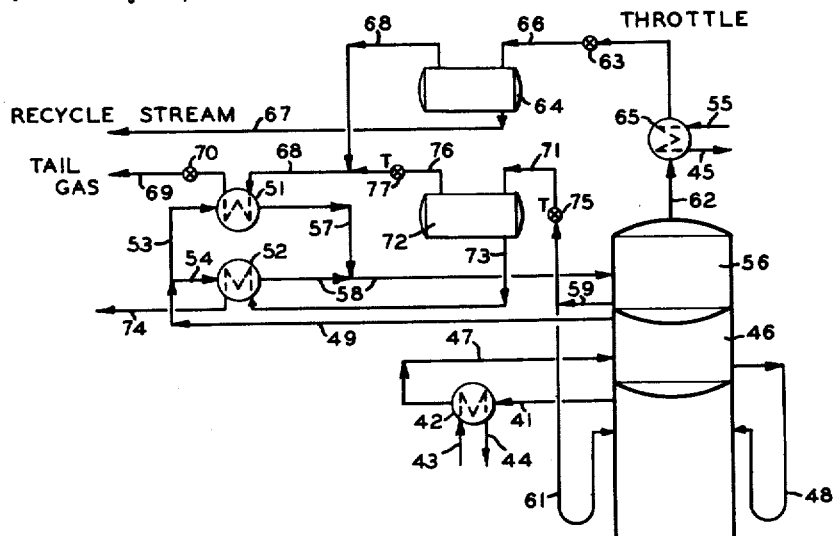
Figure 1:
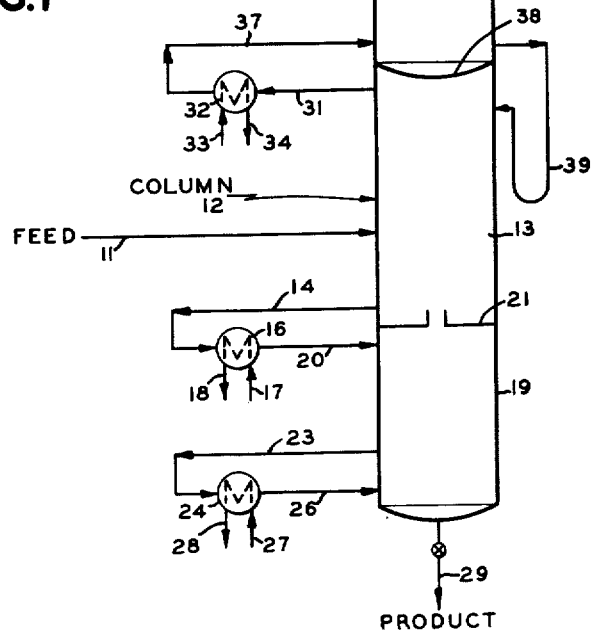

Nov. 19, 1963  F. C. CUNNINGHAM  3,111,402

HYDROCARBON SEPARATION

Filed July 20, 1959  2 Sheets-Sheet 1

*INVENTOR.*
FREDERICK C. CUNNINGHAM

BY  B. H. Palmer
    John C. Quinlan
         ATTORNEYS

Nov. 19, 1963　　　F. C. CUNNINGHAM　　　3,111,402
HYDROCARBON SEPARATION
Filed July 20, 1959　　　　　　　　　　　2 Sheets-Sheet 2

*INVENTOR.*
FREDERICK C. CUNNINGHAM
BY *D. H. Palmer*
*John L. Quinlan*
ATTORNEYS United States Patent Office 3,111,402
Patented Nov. 19, 1963

3,111,402
HYDROCARBON SEPARATION
Frederick C. Cunningham, Princeton, N.J., assignor to
The M. W. Kellogg Company, New York, N.Y., a corporation of Delaware
Filed July 20, 1959, Ser. No. 828,129
21 Claims. (Cl. 62—27)

This invention relates to an improved process for the separation of one or more normally gaseous components from a normally gaseous mixture containing the same.

This application is a continuation-in-part of application Serial No. 586,232, filed May 21, 1956, and now abandoned.

One aspect of this invention relates to an improved process for the removal of hydrogen and methane from a mixture containing the same and ethylene.

Another aspect of this invention relates to an improved process for the production of ethylene in which an intermediate product is obtained containing ethylene, methane and hydrogen and from which it is desired to remove methane and hydrogen.

One aspect of the invention has particular application to processes for the production of ethylene in which it is desired to remove methane, hydrogen and any components more volatile than ethylene from the ethylene-containing product. Such product mixtures are obtained, for example, as a result of the pyrolytic conversion of hydrocarbons and the catalytic cracking of petroleum fractions. Among the various unit operations involved in recovering ethylene from the product of such conversions, one of the most difficult is the separation of methane and hydrogen from ethylene and less volatile constituents. This separation can be accomplished in a number of ways, one of the most useful of which involves subjecting the product mixtures to fractional distillation. Fractional distillation processes designed for the separation of such low-boiling mixtures must of necessity be operated at low temperatures which are considerably below the ambient temperature level. The refrigeration required to obtain the sub-ambient temperatures necessary for such distillations can be obtained by various means but is normally obtained by the use of an auxiliary refrigeration cycle employing one or a multiplicity of appropriately low-boiling refrigerants.

It is an object of this invention to provide an improved process for the removal of hydrogen and methane from a mixture containing the same and ethylene.

It is a further object of this invention to provide an improved process and apparatus for the low-temperature separation of hydrocarbons.

It is another object of the invention to provide an improved process for the separation of one or more normally gaseous components from a normally gaseous mixture containing the same.

Another object of the invention is to provide an improved process and apparatus for removing hydrogen, methane and components more volatile than ethylene from mixtures containing the same and ethylene by low-temperature fractionation.

It is another object of the invention to provide an improved process and apparatus for attaining low temperatures in processes for the removal of hydrogen and methane from mixtures containing the same and ethylene by low-temperature fractionation.

It is another object of this invention to provide an improved process for the production of ethylene in which a product is obtained containing ethylene, methane and hydrogen and in which the hydrogen and methane are separated from the product by low-temperature fractionation.

Various other objects and advantages of the invention will become apparent from the following discussion and detailed description.

According to one aspect of the invention, hydrogen and methane are removed from a mixture containing the same and ethylene by passing the mixture to a fractionation zone at superatmospheric pressure and withdrawing from the fractionation zone a bottoms fraction containing ethylene and a vaporous fraction, more usually overhead, containing methane and hydrogen. A portion of the withdrawn vaporous fraction including some condensate produced therefrom is expanded, thereby lowering its temperature. Expanded vaporous fraction is then indirectly contacted with an unexpanded portion of the vaporous fraction thereby cooling and partially condensing the unexpanded portion. At least a portion of the condensate thus formed is returned to the fractionation zone as reflux.

According to another aspect of the invention a multi-component mixture of normally gaseous material is separated into a low-boiling fraction and a high-boiling fraction by the process which comprises passing said mixture to a fractionation zone at a superatmospheric pressure and withdrawing from said fractionation zone a bottoms fraction and a vaporized fraction, more usually overhead. A portion of the vaporized fraction including some condensate produced therefrom is expanded thereby lowering its temperature and expanded vaporized fraction is indirectly contacted with an unexpanded portion of vaporized fraction thereby cooling and partially condensing the unexpanded portion of vaporized fraction. At least a portion of the condensate thus formed is returned to the fractionation zone.

According to a preferred embodiment of the invention, methane and hydrogen are removed from a mixture containing the same and ethylene by the fractional distillation process which comprises passing the mixture to a fractionation zone at an elevated pressure, withdrawing a bottoms fraction containing ethylene from the fractionation zone, withdrawing a vaporous overhead fraction from the fractionation zone, cooling the overhead fraction withdrawn at elevated pressure whereby it is partially condensed, passing the cooled overhead fraction to a separation zone to form a condensate phase and a vapor phase, returning liquid from the separation zone to the fractionation zone, withdrawing hydrogen and methane vapors from the separation zone at an elevated pressure, expanding vapors and a portion of the liquid from the separation zone thereby lowering their temperature to below that of the vaporous overhead fraction withdrawn from the fractionation zone and indirectly contacting expanded fluid of the separation zone with said vaporous overhead fraction thereby cooling and partially condensing the same.

In the practice of the invention, the feed mixture usually contains numerous components other than ethylene, methane and hydrogen. For example, normally gaseous hydrocarbons such as ethane, $C_3$ or $C_4$ hydrocarbons etc., as well as other normally gaseous substances such as A, $N_2$, CO, $O_2$ etc., are present in varying quantities. It is within the scope of the invention to separate any relatively higher boiling fraction of such a feed mixture from the lower boiling components of the same mixture even though the process will be described primarily with regard to the preferred embodiment in which ethylene and any higher boiling components of the feed are separated from methane, hydrogen and any other components having boiling points lower than ethylene. Although the feed material for use in practicing the preferred embodiment of the invention contains methane, ethylene and hydrogen, it is within the scope of the invention to use feed material which does not contain some or all of these components.

The vaporous overhead fraction is expanded either by throttling or by expansion in an expansion engine. The use of isenthalpic throttling is preferred, however, except in cases where the relative concentration of hydrogen in the expanded fraction is high. Expansion of condensate produced from the vaporous overhead fraction is by isenthalpic throttling.

Since the Joule-Thompson coefficients of all gases other than helium are positive where the conditions prior to expansion are less than about $-110°$ F. and 550 p.s.i.a., isenthalpic expansion results in cooling of the mixture expanded. Even under operating conditions where the Joule-Thompson coefficient of hydrogen is negative, the overall effect is normally one of cooling due to the strongly positive Joule-Thompson coefficient of methane at any normal operating conditions. The small concentration of $C_2$ hydrocarbon in the fluid expanded and the small contribution of hydrogen to cooling results in most of the cooling effect being due to the methane which is usually present in comparatively large concentrations. When the fraction containing hydrogen and methane is expanded by isenthalpic throttling, a marked temperature drop occurs due to the strongly positive Joule-Thompson coefficient of the methane. During vapor expansions to downstream pressures in excess of about 100 p.s.i.a., the rate of change of the vaporization equilibrium constants for methane and ethylene with temperature is greater than their rate of change with pressure so that in expansions in accordance with the invention liquid is frequently produced at the downstream pressure by the throttling process. Although the amount of this liquid is not usually great, it carries an appreciable amount of ethylene due to the fact that some ethylene is always present in the fraction which is expanded and the relative volatility of methane to ethylene under the usual operating conditions is about 10 to 1.

It is within the scope of the invention to separate the liquid thus produced from the expanded vapor. The expanded vapor is then used to cool and partially condense the vaporous fraction from the fractional distillation zone or separation zone. The expanded vapor is usually then withdrawn from the process as tail gas. If desired, it is also used for further cooling duty, such as cooling incoming feed, prior to being released from the process. Since any ethylene contained in the tail gas thus released from the ethylene recovery process represents a loss of product, the temperature of the tail gas at the time of its separation from the liquid formed by expansion should be sufficiently low so that excessive amounts of ethylene are not lost in this manner. Since the temperature which can be reached by expansion depends largely on the temperature prior to expansion, the temperature of the vapor prior to expansion in effect determines the temperature of the tail gas following expansion. The temperature of the vapor to be expanded should, therefore, be kept sufficiently low so that losses of ethylene in the tail gas will be reduced to a minimum. In some instances, therefore, the vapor to be expanded is cooled prior to being expanded, as, for example, by indirectly contacting the vapor to be expanded with expanded tail gas obtained as described above or with an auxiliary refrigerant.

In general, the invention can be practiced at any superatmospheric pressure. Pressures of between about 300 and about 600 p.s.i.g. are preferred for the preferred embodiment of the invention, however, due to the fact that the feed need not be cooled to as low a temperature as would be required if lower operating pressures were used. The vaporous fraction to be expanded is preferably at a temperature of between about $-140$ and about $-200°$ F. under preferred pressure conditions in order to limit the amount of ethylene withdrawn in this manner and thus the amount lost in the tail gas.

It is frequently desirable to use the cold liquid separated from the expanded vapors to supply cooling duty either in connection with the invention or elsewhere in the ethylene recovery process. For instance, it can be vaporized either with or without further expansion to help cool vapors from the fractionation or separation zone. Inasmuch as this liquid contains appreciable amounts of ethylene, the overall ethylene loss is reduced by recycling this stream, with or without having used it to supply cooling duty, to an appropriate part of the recovery process so that the ethylene contained in it is recovered. The particular place to which this initially liquid stream is returned is determined by convenience and the operating conditions existing at various points.

In the use of expansion engines, it is usually considered undesirable to allow appreciable condensation to take place within the expander. For this reason, if a turbo-expander is to be used in accordance with the invention for expansions resulting in substantial liquefaction, the vaporous fraction containing hydrogen and methane is superheated prior to being cooled by expansion in order that condensation within the expander will not occur or will in any event not exceed about 10 wt. percent of the total flow of vapor at the expander intake. This superheating is conveniently accomplished by first using the vaporous fraction to be expanded to supply cooling duty at another point in the process.

In order to augment the cooling duty supplied by the expanded vapor and liquid fractions, it is often desirable to pass a high pressure liquid stream withdrawn from the fractional distillation zone or separation zone to a zone of decreased pressure, thereby cooling and partially vaporizing the same, and vaporizing the colder liquid thereby produced to cool and partially condense a portion of the vaporous overhead fraction from the fractionation zone or the high-pressure separation zone. This initially liquid stream, like the initially liquid stream separated from the expanded vapor as previously discussed, is then recycled to an appropriate point in the system so that the ethylene contained therein is recovered. The vapor produced by the expansion of the high-pressure liquid is also frequently useful separately or still in vapor-liquid form to supply cooling duty to the high-pressure vaporous stream which it is desired to cool and partially condense. Although the high-pressure liquid prior to its expansion often contains an appreciable concentration of ethylene, the vapor produced by its expansion is substantially free of ethylene and consists primarily of hydrogen and methane. Thus, the separation of this vapor from the liquid remaining after the expansion removes a significant amount of hydrogen and methane from the recycled stream. Furthermore, this vapor is often at a pressure higher than the cold tail gas, i.e., the vapor fraction of the expanded high-pressure vapor, and is thus of further use when expanded into the tail gas so as to combine with it to augment the refrigeration recoverable from it. This latter combining procedure is preferred, whenever it is possible, over the separate procedure mentioned above.

It is also within the scope of the invention to provide intermediate reflux to the fractionation zone by passing a portion of expanded intermediate fraction or expanded overhead fraction or a combination thereof in heat exchange relationship with unexpanded vaporous intermediate fraction withdrawn from the fractionation zone to condense a portion of the unexpanded intermediate fraction for return to the fractionation zone to reflux same.

The refrigeration duty required to provide the desired reflux to the high pressure fractionation zone can always be made available by the above two procedures of expanding the coldest high-pressure vapor and liquid fractions from the final high-pressure separation zone, since the amount of liquid withdrawn for expansion is for the most part recycled within the overall process and, thus, can be varied to meet any demand as long as the requisite compression capacity is made available for the recycle. In practice, however, it is usually found to be more economically advantageous to withdraw high-pressure liquid for expansion only in an amount sufficient to make up the difference in total refrigeration requirement for refluxing between that available from expansion of the high-pressure vapor and that available from specified auxiliary refrigerants. As will be apparent to those skilled in the art, the invention is capable of reducing the loss of ethylene to tail gas to any arbitrarily low value while employing ethylene boiling at 15 p.s.i.a. as the coldest available refrigerant.

Economic considerations, which vary in time and in location, define the optimum amount of ethylene that may be lost to tail gas in a given process situation. This optimum loss is, however, a very low value. The vaporous fraction to be expanded in accordance with the invention should, therefore, contain very little ethylene. It should have been cooled sufficiently so that most of the ethylene has been previously condensed and separated, leaving the vaporous fraction to be expanded relatively free of ethylene. Similarly, the high-pressure liquid should be withdrawn from the separation process where its ethylene concentration is lowest in order to minimize ethylene losses or recompression costs. This is accomplished in the preferred forms of the invention by cooling overhead from the fractionation zone and passing the cooled and partially condensed overhead to a separation zone from which liquid is returned as reflux to the fractionation zone. Vapor and a portion of the liquid from the separation zone is then expended in accordance with the invention. When still higher recoveries of ethylene are sought, more than one separation zone is used in a similar manner with vapor from the first being cooled and passed to the second, etc. Vapor and a portion of the liquid from the last is expanded and used to cool and partially condense vapor from one or more of the previous separation zones and liquid from each is returned as reflux to the fractionation zone. Instead of utilizing separation zones in connection with the fractionation zone, trays are frequently used to collect vapors and liquids from the various portions of the fractionation zone, as required. In such instances, the fractionation zone containing collecting trays is equivalent to the use of one or more separation zones in connection with a fractionation zone without such trays and the vaporous fraction to be expanded is an overhead fraction from the fractionation zone, rather than from a separation zone.

It is also possible in accordance with the invention to utilize a fractionation zone without collecting trays and to perform the necessary heat exchange within the fractionation zone to obtain a suitable vaporous fraction to be expanded and suitable reflux. In this event, the separation zone or zones associated with the fractionation zone are dispensed with and a vaporous overhead fraction from the fractionation zone is expanded with the expanded vapors being used to supply cooling duty within the fractionation zone in cooling coils or the like.

Figure 2:
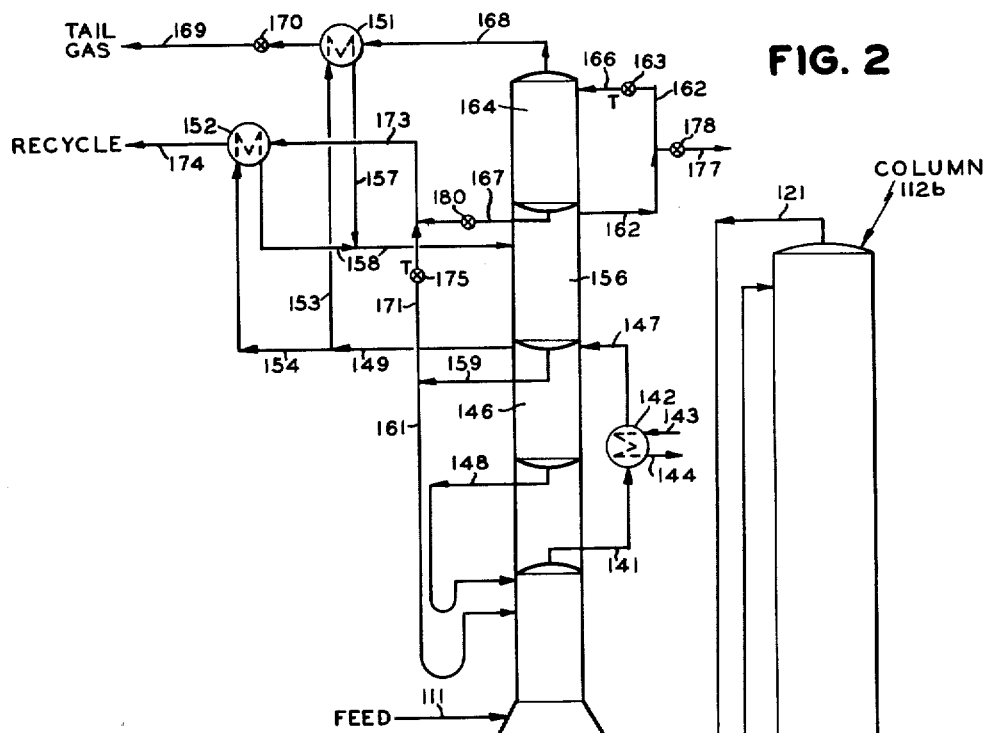
Figure 3:
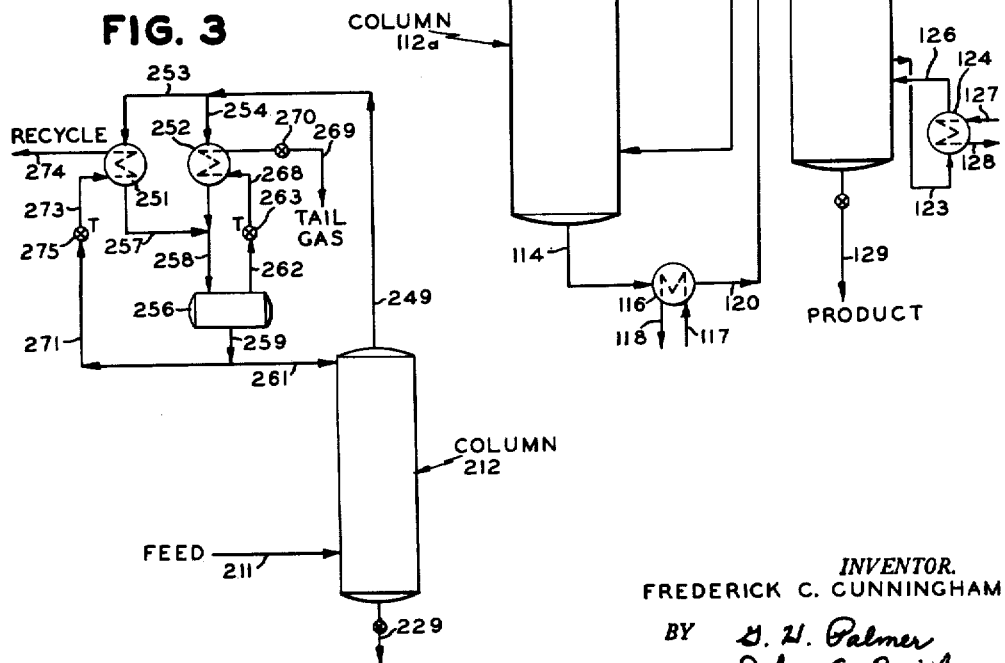

For a better understanding of the invention and for examples showing its application, reference is had to the accompanying drawings, in which FIGURE 1 is a diagrammatic illustration in elevation of apparatus designed for use in practicing a preferred embodiment of the invention; FIGURE 2 is a modification of FIGURE 1 and is a diagrammatic illustration in elevation of apparatus designed for use in practicing another preferred embodiment; and FIGURE 3 is a simplified flow sheet showing the more important features of FIGURES 1 and 2.

EXAMPLE I

In FIGURE 1, feed containing hydrogen, methane, $C_2$ and $C_3$ hydrocarbons enters through conduit 11 at the rate of 30,532 pounds per hour. This feed is the product of a process for the pyrolytic conversion of gasoline to ethylene. Prior to its appearance in conduit 11, the pyrolysis product is cooled and a heavy fraction of fuel oil separated therefrom. Since the remaining product contains considerable amounts of steam, it is further water-cooled and some condensed water and normally liquid hydrocarbons are withdrawn. This product is then compressed and water-cooled again so that more condensed water and liquid hydrocarbons can be withdrawn. This product is then further compressed and water-cooled to condense even more of the entrained water vapor and liquid hydrocarbons. Following the final separation of water and liquid hydrocarbons, the product remaining is compressed a third time, subjected to a caustic wash for sulfur removal, water wash for caustic removal and is dried by physical adsorption to remove all water vapor. Finally, the desulfurized and dried product fraction remaining, which contains hydrogen, methane, $C_2$ and $C_3$ hydrocarbons, is cooled and partially condensed and enters through conduit 11 as feed. The feed has the composition shown in Table I below:

*Table I*

| Component | Lb./Hr. | Mol/Hr. | Mol percent |
|---|---|---|---|
| Hydrogen | 339 | 169.5 | 12.9 |
| Methane | 6,993 | 437.1 | 33.1 |
| Ethylene | 10,185 | 363.7 | 27.6 |
| Acetylene | 23 | 0.9 | 0.1 |
| Ethane | 4,053 | 135.1 | 10.2 |
| Propylene | 7,989 | 190.2 | 14.4 |
| Propane | 915 | 20.8 | 1.6 |
| Methyl Acet. | 13 | 0.3 | 0.1 |
| Butadiene | 4 | 0.1 | |
| Butylenes | 18 | 0.3 | |
| | 30,532 | 1,318.0 | 100.0 |

The feed entering through conduit 11 passes to a fractional distillation zone or column 12 having fractionation stages 13, 19 and 36. The feed enters column 12 at about —80° F. and 440 p.s.i.g. under which conditions it is about 25 weight percent vapor and 75 weight percent liquid. Column 12 is designed to effect a separation of hydrogen and methane from the other constituents of the feed. A liquid fraction is withdrawn from the bottom of fractionation stage 13 through conduit 14 and passes through a heat exchanger 16 in which it is partially vaporized by indirect contact with condensing propane which enters exchanger 16 through conduit 17 and is removed through conduit 18. The condensing of propane at this intermediate level of refrigeration effects economies in the auxiliary propane refrigeration system. The thus warmed and partially vaporized stream is passed from exchanger 16 to a fractionation stage 19 through conduit 20. Fractionation stage 19 is situated directly below fractionation stage 13 and is separated therefrom by a baffle 21 containing an opening therein through which vapor may rise from fractionation stage 19 to fractionation stage 13. A liquid fraction is withdrawn from the lower portion of fractionation stage 19 through conduit 23, heated and partially vaporized by indirect contact with propane condensing in heat exchanger 24 at a higher refrigeration level than employed in exchanger 16 and returned to fractionation zone 19 through conduit 26. The propane used in exchanger 24 enters through conduit 27 and is withdrawn through conduit 28. The condensing of propane at this higher but still subambient, refrigeration level effects further economies in the auxiliary propane system. A bottoms fraction comprising $C_2$ and $C_3$ hydrocarbons and having the composition shown in Table II is withdrawn from fractionation stage 19 through conduit 29 at the rate of 23,026 pounds per hour constituting the bottoms fraction from zone or column 12 and is further treated for the recovery of ethylene therefrom.

*Table II.—Composition of Fraction Withdrawn Through Conduit 29*

| Component | Lb./Hr. | Mol/Hr. | Mol percent |
|---|---|---|---|
| Methane | 21 | 1.4 | 0.2 |
| Ethylene | 9,997 | 357.1 | 50.5 |
| Acetylene | 23 | 0.9 | 0.1 |
| Ethane | 4,046 | 134.9 | 19.2 |
| Propylene | 7,989 | 190.2 | 26.9 |
| Propane | 915 | 20.8 | 3.0 |
| Methyl Acet | 13 | 0.3 | |
| Butadiene | 4 | 0.1 | 0.1 |
| Butylenes | 18 | 0.3 | |
| | 23,026 | 706.0 | 100.0 |

Vapor from the upper portion of fractionation stage 13 is withdrawn through conduit 31 and passed to a heat exchanger 32 where it is cooled and partially condensed by indirect heat exchange with ethylene which enters through conduit 33 at a temperature of −20° F. and is withdrawn through conduit 34. The application of this intermediate level of ethylene refrigeration in this manner effects economies in the auxiliary refrigeration system. The cooled and partially condensed overhead fraction from fractionation stage 13 is then passed from an exchanger 32 to a fractionation stage 36 through conduit 37. Fractionation stage 36 is separated from fractionation stage 13 by a partition 38. From the bottom of fractionation stage 36 reflux liquid is passed to fractionation zone 13 through conduit 39. A vaporous overhead fraction is withdrawn from fractionation stage 36 constituting the overhead fraction of zone or column 12 through conduit 41 and is passed to a heat exchanger 42 where it is cooled and partially condensed by indirect heat exchange with ethylene which is introduced through conduit 43 at a temperature of −150° F. and withdrawn through conduit 44. Ethylene at −150° F. is close to its atmospheric boiling point. This temperature is the lowest practical one with ethylene auxiliary refrigeration. Vacuum evaporation of auxiliary ethylene, while theoretically quite possible, is practically undesirable because of dangers and difficulties inherent in infiltration of atmospheric air. A lower level of auxiliary refrigeration could be obtained by the use of methane or nitrogen while maintaining superatmospheric pressure evaporation conditions. However, the invention avoids these less economic auxiliary systems and supplies the requisite refrigeration below the −150° F. level by utilizing most economically the potential of the process system itself for self-refrigeration inherent in its elevated pressure. From exchanger 42, the cooled and partially condensed fraction is passed to a separation zone 46 through conduit 47. Liquid from separation zone 46 is passed as reflux to fractionation stage 36 through conduit 48. Vapor from separator 46 is withdrawn through conduit 49 and passes to heat exchangers 51 and 52 through conduits 53 and 54, respectively. In exchangers 51 and 52 the vaporous fraction from separator 46 is cooled and partially condensed and is then passed to a separator 56 through conduits 57 and 58. Liquid is withdrawn from separator 56 through conduit 59. Part of the liquid from conduit 59 is passed through conduit 61 as reflux to fractionation stage 36.

Vapor is withdrawn from separator 56 through conduit 62 and is passed to a throttling valve 63 where it is isenthalpically expanded and thereby cooled and partially condensed. The cooled and partially condensed vapor from separator 56 is passed from throttling valve 63 to a separator drum 64 through conduit 66. A heat exchanger 65 is provided so that the vapor in conduit 62 can be superheated, if desired. Such superheating is useful, for instance, if throttle 63 is replaced by a turboexpander or other expansion engine. When heat exchanger 65 is used, the vapor in conduit 62 is superheated by indirect contact with heat exchange medium which is, for instance, a fraction from one of the fractionation stages in distillation column 12. Heat exchange fluid enters heat exchanger 65 through conduit 55 and leaves through conduit 45. Recovery of refrigeration from the vapors in conduit 62 and simultaneous superheating thereof is conveniently accomplished, for example, by using exchanger 65 for the heat exchange duty of both exchangers 32 and 65 in which case vapors in conduit 31 pass through conduit 55 to exchanger 65 and are returned to conduit 37 through conduit 45 in which case exchanger 32 and conduits 33 and 34 are obviated. Other similar combining features are equally possible. Liquid is withdrawn from separator 64 through conduit 67 and is returned to an earlier stage of the ethylene recovery process where it is recombined with the main product stream in order to recover the ethylene contained in it. In this particular example, the liquid from conduit 67 is first heated to a temperature of 0° F. and is then combined with the pyrolysis product after the pyrolysis product has been compressed and recooled the first time. The pyrolysis product at this point is maintained at a temperature of 100° F. and a pressure of 47 p.s.i.g. Since the amount of liquid from conduit 67 is small compared with the total pyrolysis product, its effect on the temperature of the product stream is slight. More importantly, this small increment of material does not at all effect the installed size of this compressor and causes only a negligible increase in its power consumption. Cold vapor is withdrawn from separator 64 through conduit 68 and is passed to exchanger 51 where it is utilized in indirect heat exchange to cool and partially condense the vaporous fraction from separator 46 which enters exchanger 51 through conduit 53. The vapor which enters exchanger 51 through conduit 68 is withdrawn through conduit 69 and is passed from the system through a valve 70 at the rate of 6,642 pounds per hour as tail gas having the composition shown in Table III below:

*Table III.—Tail Gas Composition*

| | Mol percent |
|---|---|
| $H_2$ | 31.25 |
| $C_1$ | 68.50 |
| $C_2$ | 0.25 |
| | 100.00 |

The tail gas leaving through conduit 69 is preferably used to cool the incoming feed prior to being released completely from the system.

Since it frequently happens that the expanded tail gas alone is unable to provide sufficient cooling duty to cool the entire vapor fraction in conduit 49 to the desired operating temperature of separator 56, the remainder of this cooling duty must be supplied, preferably without the use of an auxiliary refrigerant. To accomplish this, that portion of the liquid from conduit 59 which is not returned to fractionation zone 36 through conduit 61 is passed through conduit 71 and a throttle 75 to a separator drum 72 which is maintained at a considerably lower pressure than separator 56 from which the liquid was withdrawn. When the liquid in conduit 71 passes through throttle 75, the reduction in pressure causes part of it to vaporize thereby cooling the entire mixture. The thus cooled liquid is withdrawn from separator 72 through conduit 73 and passed to exchanger 52 where it is vaporized and used in indirect heat exchange to cool and partially condense that portion of the vapor from conduit 49 which is passed through exchanger 52 to conduit 58. The liquid which entered exchanger 52 through conduit 73 is withdrawn through conduit 74 and recycled to a previous stage of the ethylene recovery process where it is recombined with the main product stream in order to recover the ethylene contained in it. In this particular example, the vapor from conduit 74 is heated to a temperature of 0° F. and is then combined with the product fraction containing hydrogen, methane, $C_2$ and $C_3$ hydrocarbons following the separation of this fraction from other pyrolysis products and just prior to the final stage of feed compression. The product fraction at this point is maintained at a temperature of −25° F. and a pressure of 130 p.s.i.g. Since it is this fraction which enters through conduit 11 as feed, it can be seen that in this way the liquid from conduit 74 is recycled and recombined with the product stream so that the ethylene contained in it is not lost from the process. Here again, the increment of recycle material added to the main feed stream is so small as to cause no increase in the installed size of the final compressor and negligible increase in its power consumption.

It can readily be seen that the invention, amongst its other advantages, replaces a separate methane or other low-level auxiliary refrigeration system by superimposing relatively minor, but highly important, flows of recycle material on the feed compressors which are in any event required.

Vapor is withdrawn from separator 72 through conduit 76 and passed through valve 77 to conduit 68 where it is combined with the vapor from separator 64. Since separator 72 is operated at a higher pressure than separator 64, the vapor from separator 72 is throttled through valve 77 into conduit 68.

The material from conduit 74 as well as that from conduit 67, is recycled to any convenient and appropriate prior stage of the ethylene recovery process. It may, of course, be used first to provide cooling duty in the precooling of the feed or otherwise, and the exact point at which these streams are recombined with the main product stream will depend usually upon the temperature and pressure conditions involved, particularly the pressure conditions since it is, of course, advantageous to avoid the use of special pumps for this purpose. Since the streams in conduits 74 and 67 are recycled and contain almost all of the ethylene which was withdrawn from separator 56 by conduits 62 and 71, it can be seen that the use of the invention results in the recovery of almost all of this ethylene.

It is entirely within the scope of the invention to dispense with separator 72 or exchanger 52 and separator 72 as well as the conduits associated therewith as the case is, for example, conduits 71, 73, 74, 77, 54 and 58, and supply any needed cooling duty from other sources if necessary. For instance, the liquid in conduit 67 is useful in supplying cooling duty to the vapor withdrawn from separator 46 in conduit 49, if desired. Similarly, in certain cases separator 64 and conduit 67 are not required and satisfactory separations are obtained with the remainder of the system.

For a specific example of the use of the invention as illustrated in FIGURE 1, reference should be had to Table IV which discloses appropriate operating conditions for such use.

*Table IV.—Example of the Use of the Invention With the Apparatus Shown in FIGURE 1*

| Equipment or location | Temp. (° F.) | Pressure (p.s.i.g.) |
|---|---|---|
| Feed | −80 | 440 |
| Fractionation zone 13 (top) | −96 | 440 |
| Fractionation zone 13 (bottom) | 14 | 440 |
| Fractionation zone 19 (top) | 20 | 450 |
| Fractionation zone 19 (bottom) | 58 | 450 |
| Fractionation zone 36 (top) | −131 | 438 |
| Fractionation zone 36 (bottom) | −115 | 438 |
| Separator 46 | −145 | 437 |
| Separator 56 | −157 | 435 |
| Separator 64 | −207 | 97 |
| Separator 72 | −191 | 145 |
| Tail gas (conduit 69) | −150 | 95 |
| Recycle stream (conduit 67) | −210 | 95 |
| Recycle stream (conduit 74) | −150 | 144 |

The coldest auxiliary refrigerant required when practicing the invention as embodied in the foregoing example is used at a temperature of −150° F. which temperature can be obtained with ethylene. Since the usual methods for low temperature fractionation to remove hydrogen and methane in processes for the recovery of ethylene require the use of colder auxiliary refrigeration for which methane must normally be used, it can be seen that the use of the invention completely eliminates the necessity for a methane refrigeration system. The use of even the −150° F. ethylene is, according to the invention, limited to supplying the amount of cooling necessary to insure the proper amount of reflux through conduit 48. In the use of the invention the primary source of low temperature cooling is the cooling duty provided in exchangers 51 and 52 as previously explained. Although this cooling duty is available at sufficiently low temperature levels and is made available in sufficient quantity to provide a sufficient amount of reflux for the proper operation of fractionation stage 36, such an extreme extension of the invention will not usually be the economic optimum. The −150° F. ethylene which is used to supply cooling duty in exchanger 42 merely provides sufficient cooling duty to supplement the cooling duty of exchangers 51 and 52 in order to provide more economically sufficient reflux to fractionation stage 36.

In FIGURE 1 fractionation stage 36 and separators 46 and 56 are shown as being contained in the same tower as fractionation stages 13 and 19. This has been done as a matter of convenience and it is entirely possible to operate according to the invention with the conditions shown in Table IV when separators 46 and 56 and fractionation stage 36 are maintained as separate units.

The propane which is used to provide reboiling heat in exchangers 16 and 24 as well as the ethylene used to provide reflux duty in exchangers 32 and 42 is obtained from an auxiliary refrigeration system. Such systems are well known for use in connection with processes for the low temperature fractionation of hydrocarbon fractions for the recovery of ethylene and it is entirely within the scope of the invention to substitute other suitable refrigerants in the auxiliary system, e.g., propylene for propane and ethane for ethylene.

EXAMPLE II

Referring now to FIGURE 2 for another example of the invention applied to a process which is a modification of that illustrated in FIGURE 1, feed containing hydrogen, methane, $C_2$ and $C_3$ hydrocarbons enters fractional distillation column 112a through conduit 111 at a rate of 156,940 pounds per hour and has the composition shown in Table V below.

*Table V*

| Component | Lb./Hr. | Mol/Hr. | Mol Percent |
|---|---|---|---|
| Nitrogen, Carbon monoxide, oxygen | 1,958 | 68.3 | 1.0 |
| Hydrogen | 2,579 | 1,289.6 | 18.4 |
| Methane | 31,693 | 1,980.0 | 28.3 |
| Acetylene | 792 | 30.4 | 0.4 |
| Ethylene | 54,518 | 1,947.0 | 27.9 |
| Ethane | 22,226 | 741.2 | 10.6 |
| Methyl Acetylene | 724 | 18.1 | 0.3 |
| Propadiene | 290 | 7.3 | 0.1 |
| Propylene | 28,939 | 689.0 | 9.8 |
| Propane | 1,680 | 38.0 | 0.5 |
| Butadiene | 2,671 | 49.3 | 0.7 |
| Butylenes | 4,905 | 88.3 | 1.3 |
| Butanes | 163 | 2.8 | -- |
| $C_5$'s | 2,115 | 29.9 | 0.4 |
| $C_6$'s | 1,543 | 18.9 | 0.3 |
| $C_7$'s | 144 | 1.6 | -- |
| | 156,940 | 6,999.7 | 100.0 |

Note that throughout this example the numerical character used to refer to an element of the apparatus is one hundred higher than that used to refer to the substantially equivalent element of the appartus of FIGURE 1.

The feed which appears in conduit 111 is a product of a process for the pyrolytic conversion of light naphtha to unsaturated hydrocarbons, including ethylene. This product passes through a series of treating steps similar to those to which the pyrolysis product of Example I is subjected. Column 112a and fractional distillation column 112b in combination constitute a fractionation zone designed to effect a separation of hydrogen and methane from the other constituents of the feed. Column 112a of FIGURE 2 is substantially equivalent to fractionation stages 36 and 13 of column 12 of FIGURE 1, and column 112b is similarly like fractionation stage 19 of column 12. A liquid fraction is withdrawn from the bottom of column 112a through conduit 114 and passes through a heat exchanger 116 in which it is partially vaporized by indirect contact with condensing propylene which enters exchanger 116 through conduit 117 and is removed through conduit 118. The condensing of propylene at this intermediate level of refrigeration effects economies in the auxiliary propylene refrigeration system. The thus warmed and partially vaporized stream is passed from exchanger 116 to column 112b through conduit 120. Vapor is returned from the top of column 112b to the lower portion of column 112a through conduit 121 (functionally equivalent to baffle 21 separating fractionation stages 13 and 19 of column 12, all of FIGURE 1). A liquid fraction is withdrawn from the lower portion of column 112b through conduit 123, heated and partially vaporized by indirect contact with propylene condensing in heat exchanger 124 at a higher refrigeration level than employed in exchanger 116 and returned to column 112b through conduit 126. The propylene used in exchanger 124 enters through conduit 127 and is withdrawn through conduit 128. A bottoms fraction comprising $C_2$ and $C_3$ hydrocarbons and having the composition shown in Table VI is withdrawn from column 112b through conduit 129 at the rate of 119,387 pounds per hour constituting the bottoms fraction of the fractionation zone and is further treated for the recovery of ethylene therefrom.

*Table VI.—Composition of Fraction Withdrawn Through Conduit 129*

| Component | Lb./Hr. | Mol/Hr. | Mol Percent |
|---|---|---|---|
| Methane | 141 | 8.8 | 0.2 |
| Acetylene | 792 | 30.4 | 0.8 |
| Ethylene | 53,171 | 1,899.0 | 52.5 |
| Ethane | 22,109 | 737.3 | 20.4 |
| Methyl Acetylene | 724 | 18.1 | 0.5 |
| Propadiene | 290 | 7.3 | 0.2 |
| Propylene | 28,939 | 689.0 | 19.0 |
| Propane | 1,680 | 38.0 | 1.1 |
| Butadiene | 2,671 | 49.3 | 1.4 |
| Butylenes | 4,905 | 88.3 | 2.4 |
| Butanes | 163 | 2.8 | 0.1 |
| $C_5$'s | 2,115 | 29.9 | 0.8 |
| $C_6$'s | 1,543 | 18.9 | 0.5 |
| $C_7$'s | 144 | 1.6 | 0.1 |
| | 119,387 | 3,618.7 | 100.0 |

A vaporous overhead fraction constituting the overhead fraction of the fractionation zone is withdrawn from column 112a through conduit 141 and is passed to a heat exchanger 142 where it is cooled and partially condensed by indirect heat exchange with ethylene which is introduced through conduit 143 at a temperature of −150° F. and withdrawn through conduit 144. From exchanger 142, the cooled and partially condensed fraction is passed through conduit 147 to a separator 146 to form a liquid phase and a vapor phase therein. Liquid from separation zone 146 is passed as reflux to column 112a through conduit 148. Vapor from separator 146 is withdrawn through conduit 149 and passes to heat exchangers 151 and 152 through conduits 153 and 154, respectively. In exchangers 151 and 152 the vaporous fraction from separator 146 is cooled and partially condensed and is then passed to a separator 156 through conduits 157 and 158. Liquid is withdrawn from separator 156 through conduit 159. Part of the liquid from conduit 159 is passed through conduit 161 as reflux to column 112a.

Vapor is withdrawn from separator 156 through conduit 162 and a portion thereof is passed to a throttling valve 163 where it is isenthalpically expanded and thereby cooled. A conduit 177 with valve 178 is shown communicating with conduit 162 for withdrawing a portion of the high-pressure vapors from separator 156 for use elsewhere in the process, in this example, as a convenient source of high-pressure hydrogen for selective hydrogenation of acetylene in ethylene. The vapor expanded at throttle 163 is passed to a separator drum 164 through conduit 166. Cold vapor is withdrawn from separator 164 through conduit 168 and is passed to exchanger 151 where it is utilized in indirect heat exchange to cool and partially condense the vaporous fraction from separator 146 which enters exchanger 151 through conduit 153. The vapor which enters exchanger 151 through conduit 168 is withdrawn through conduit 169 and is passed from the system through a valve 170 at the rate of 34,670 pounds per hour as tail gas having the composition shown in Table VII below:

*Table VII.—Tail Gas Composition*

| | Mol percent |
|---|---|
| $H_2$ | 39.5 |
| $C_1$ | 59.7 |
| $C_2$ | 0.8 |
| | 100.0 |

The tail gas leaving through conduit 169 is used to cool the incoming feed (not shown) prior to being released completely from the system for further use as fuel gas.

As in Example I, the expanded tail gas alone is unable to provide sufficient cooling duty to cool the entire vapor fraction in conduit 149 to the desired operating temperature of separator 156. Accordingly, that portion of the liquid from conduit 159 which is not returned to column 112a through conduit 161 is passed through conduit 171 to throttle 175 whereby the liquid is expanded and thereby partially vaporized and cooled. The liquid of separator 164 is withdrawn through conduit 167 with valve 180 and combined with the expanded liquid from throttle 175. The thus combined liquid of separators 156 and 164 is passed as a vapor-liquid mixture through conduit 173 to exchanger 152 where the liquid is vaporized and used in indirect heat exchange to cool and partially condense that portion of the vapor from conduit 149 which is passed through exchanger 152 to conduit 158. The vapor-liquid mixture which entered exchanger 152 through conduit 173 is withdrawn through conduit 174 and recycled to a previous stage of the ethylene recovery process where it is recombined with the main product stream in order to recover the ethylene contained in it. In this particular example, the vapor from conduit 174 is heated to a temperature of 50° F. and is then combined with the product fraction containing hydrogen, methane, $C_2$ and $C_3$ hydrocarbons following the separation of this fraction from other pyrolysis products and just prior to the second stage of feed compression. As in Example I, this recycle is so small as to have no material effect on the size of the compressor.

Reference should be had to Table VIII for disclosure of the operating conditions of Example II as illustrated in FIGURE 2.

*Table VIII.—Example of the Use of the Invention With the Apparatus Shown in FIGURE 2*

| Equipment or location | Temp. (° F.) | Pressure (p.s.i.g.) |
|---|---|---|
| Feed (Conduit 111) | −80 | 492 |
| Column 112a (top) | −113 | 490 |
| Column 112a (bottom) | −10 | 493 |
| Column 112b (top) | 0 | 494 |
| Column 112b (bottom) | 60 | 495 |
| Separator 146 | −145 | 487 |
| Separator 156 | −158 | 485 |
| Separator 164 | −205 | 110 |
| Tail Gas (Conduit 169) | −150 | 150 |
| Expanded Liquid (Conduit 173) | −218 | 33 |
| Recycle stream (Conduit 174) | −150 | 30 |

It is seen that this example, like Example I, makes novel and effective use of the inherent ability of the process system for auto-refrigeration whereby the coldest available auxiliary refrigerant required is ethylene boiling at −150° F. This example, in contrast to Example I, employs two rather than three fractionation stages, three rather than four separation zones, and a slightly different physical arrangement of the apparatus. The example illustrates thereby the wide variety of processing arrangements in which the invention is useful. Thus, it is seen that a single fractionation stage and two or less separation zones can be used when practicing the invention.

FIGURE 3 is a diagrammatic illustration in elevation of apparatus for practicing the invention in a simplified form. Elements of the figure substantially equivalent to elements of FIGURES 1 and 2 are designated by numbers two hundred higher than the corresponding element of FIGURE 1 and one hundred higher than the corresponding element of FIGURE 2.

Thus, a multi-component mixture of vaporizable material which it is desired to separate into a high-boiling fraction and a low-boiling fraction is introduced to fractional distillation zone or column 212 through conduit 211. The high-boiling fraction is withdrawn as a liquid from the lower portion of column 212 through conduit 229. The vaporous low-boiling fraction (the overhead fraction as shown) is withdrawn from the upper portion of the column 212 through conduit 249 which divides into conduits 253 and 254 leading to heat exchangers 251 and 252. In exchangers 251 and 252 vaporous low-boiling fraction is cooled and partially condensed. The cooled and partially condensed low-boiling fraction is passed from exchangers 251, and 252 through conduits 257 and 258 to separation zone 256 to form a liquid phase and a vapor phase therein. Liquid is withdrawn from separation zone 256 through conduit 259. A portion of the liquid from separator 256 is passed through conduit 261 to column 212 as reflux. The other portion of the condensate from separator 256 is passed through conduit 271 to throttle 275 and thereby is partially vaporized and further cooled. Thus further cooled condensate from throttle 275 is passed through conduit 273 in indirect heat exchange with unexpanded vapors from column 212 in exchanger 251. The expanded condensate fraction entering exchanger 251 through conduit 273 is withdrawn through conduit 274 and recycled to a previous point in the recovery process. Unexpanded vaporous fraction from separator 256 is passed through conduit 262 to throttle 263 wherein it is expanded and thereby cooled. The expansion cooled vaporous fraction from throttle 263 is passed through conduit 268 in indirect heat exchange with unexpanded vapors from the fractionation column 212 in exchanger 252. The expanded fraction entering exchanger 252 through conduit 268 is withdrawn through conduit 269 with valve 270 as tail gas.

It should be understood that the use of the invention is not limited to the apparatus or method shown in the drawing. Other aspects or embodiments of the invention disclosed herein or which will become apparent from a study of this disclosure are equally within the scope of the invention. Alterations and modifications of the embodiments described herein may also, of course, be made without departing from the scope of the invention.

What is claimed is:

1. In a process for the production of ethylene in which a product is obtained containing ethylene, methane and hydrogen, the method of removing hydrogen and methane from said mixture which comprises passing said mixture to a fractionation zone, withdrawing a bottoms fraction containing ethylene from the fractionation zone, withdrawing a vaporous overhead fraction from the fractionation zone at an elevated pressure, cooling at least a portion of the withdrawn overhead fraction whereby it is partially condensed, passing the cooled overhead fraction to a separation zone to form a liquid phase and a vapor phase therein, passing liquid from the separation zone to the fractionation zone, withdrawing a vaporous fraction comprising hydrogen and methane from the separation zone at an elevated pressure, expanding the vaporous fraction from the separation zone thereby lowering its temperature to below that of the vaporous overhead fraction withdrawn from the fractionation zone, indirectly contacting expanded vapors of the separation zone with at least a portion of the vaporous overhead fraction thereby cooling and partially condensing the same, passing condensate thus formed to the separation zone, passing liquid from the separation zone to a zone of reduced pressure whereby said liquid is partially vaporized and cooled to below the temperature of the vaporous overhead fraction, indirectly contacting the thus cooled liquid with at least a portion of the vaporous overhead fraction thereby cooling and partially condensing the same and passing condensate thus formed to the separation zone.

2. In a process for the production of ethylene in which a product is obtained containing ethylene, methane and hydrogen, the method of removing hydrogen and methane from said mixture which comprises passing said mixture to a fractionation zone, withdrawing a bottoms fraction containing ethylene from the fractionation zone, withdrawing a vaporous overhead fraction from the fractionation zone at an elevated pressure, cooling the withdrawn overhead fraction whereby it is partially condensed, passing the cooled overhead fraction to a first separation zone to form a liquid phase and a vapor phase therein, passing liquid from the first separation zone to the fractionation zone, withdrawing and cooling a vaporous fraction from the first separation zone whereby a portion thereof is condensed, passing the thus cooled fraction of the first separation zone to a second separation zone to form a liquid phase and a vapor phase therein, passing liquid from the second separation zone to the fractionation zone, withdrawing a vaporous fraction comprising hydrogen and methane from the second separation zone at an elevated pressure, expanding the vaporous fraction from the second separation zone thereby lowering its temperature to below that of the vaporous fraction withdrawn from the first separation zone, indirectly contacting expanded vapors of the second separation zone with vaporous fraction of the first separation zone to accomplish part of the aforesaid cooling thereof, withdrawing liquid from said second separation zone at an elevated pressure, expanding liquid withdrawn from said second separation zone thereby partially vaporizing the same and lowering its temperature to below that of the vaporous fraction withdrawn from the first separation zone, indirectly contacting expanded liquid of the second separation zone with vaporous fraction of the first separation zone to accomplish another part of the aforesaid cooling thereof.

3. Apparatus for the separation of hydrogen and methane from a mixture containing the same and ethylene which comprises in combination a fractionation column, a conduit communicating with the lower portion of said fractionation column for removing liquid from said fractionation column, a conduit communicating with said fractionation column for introducing said mixture into said fractionation column, a reflux condenser for cooling and partially condensing vapors from said fractionation column, a first liquid-vapor separation vessel, a conduit passing from the upper portion of said fractionation column to said reflux condenser and then to said first liquid-vapor separation vessel for passing fluid from said fractionation column to said reflux condenser and then to said first liquid-vapor separation vessel, a conduit passing from said first liquid-vapor separation vessel to said fractionation column for passing liquid from said first liquid-vapor separation vessel to the upper portion of said fractionation column, first and second heat exchangers for cooling and partially condensing vapor from said first liquid-vapor separation vessel, a second liquid-vapor separation vessel, a conduit passing from said first liquid-vapor separation vessel which divides into two branches that recommunicate with each other to again form a single conduit which passes to said second liquid-vapor separation vessel, one of said branches passing through said first heat exchanger and the other of said branches passing through said second heat exchanger, said branched conduit being used to pass fluid from said first liquid-vapor separation vessel to said first and second heat exchangers and then to said second liquid-vapor separation vessel; a throttle for isenthalpically expanding vapor from said second liquid-vapor separation vessel, a conduit communicating between said second liquid-vapor separation vessel and said throttle for passing vapor from said second liquid-vapor separation vessel to said throttle, a third liquid-vapor separation vessel, a conduit communicating between said throttle and said third liquid-vapor separation vessel for passing fluid from said throttle to said third liquid-vapor separation vessel, a conduit communicating with said third liquid-vapor separation vessel for removing liquid therefrom, a conduit communicating between said third liquid-vapor separation vessel and said second heat exchanger for passing vapor from said third liquid-vapor separation vessel to said second heat exchanger, a fourth liquid-vapor separation vessel, a branched conduit communicating with said second liquid-vapor separation vessel one branch of which communicates with the upper portion of said fractionation column for passing liquid from said second liquid-vapor separation vessel to said fractionation column and the other branch of which communicates with said fourth liquid-vapor separation vessel for passing liquid from said second liquid-vapor separation vessel to said fourth liquid-vapor separation vessel, a second throttle in said conduit branch communicating between said second liquid-vapor separation vessel and said fourth liquid-vapor separation vessel for expanding liquid from said second liquid-vapor separation vessel, a conduit communicating between said fourth liquid-vapor separation vessel and said first heat exchanger for passing liquid from said fourth liquid-vapor separation vessel to said first heat exchanger and a conduit communicating with said fourth liquid-vapor separation vessel and combining with said conduit passing between said third liquid-vapor separation vessel and said second heat exchanger for passing vapor from said fourth liquid-vapor separation vessel to said second heat exchanger.

4. Apparatus for the separation of a multi-component mixture of vaporizable material into a low-boiling fraction and a high-boiling fraction which comprises in combination fractionation means, means for introducing said mixture into said fractionation means, means for withdrawing a liquid high-boiling fraction from the lower portion of said fractionation means, means for withdrawing a vaporous low-boiling fraction from the upper portion of said fractionation means, means for cooling and partially condensing at least a portion of said low-boiling vaporous fraction, means for separating said cooled fraction into liquid and vapor fractions, first expansion means for expanding a portion of the condensate from thus cooled low-boiling fraction thereby partially vaporizing and further cooling the same, means for passing thus expanded portion to said cooling and partial condensing means, second expansion means for expanding at least a portion of the vapor from thus cooled low-boiling fraction thereby further cooling the same, means for passing thus expanded vapor to said cooling and partial condensing means, and means for passing another portion of the condensate from thus cooled low-boiling fraction to said fractionation means.

5. Apparatus for the separation of hydrogen and methane from a mixture containing the same and ethylene which comprises in combination a fractionation column, a conduit communicating with the lower portion of said fractionation column for removing liquid from said fractionation column, a conduit communicating with said fractionation column for introducing said mixture into said fractionation column, a reflux condenser for cooling and partially condensing vapors from said fractionation column, a first liquid-vapor separation vessel, a conduit passing from the upper portion of said fractionation column to said reflux condenser and then to said first liquid-vapor separation vensel for passing fluid from said fractionation column to said reflux condenser and then to said first liquid-vapor separation vessel, a conduit passing from said first liquid-vapor separation vessel to said fractionation column for passing liquid from said first liquid-vapor separation vessel to said fractionation column, first and second heat exchangers for cooling and partially condensing vapor from said first liquid-vapor separation vessel, a second liquid-vapor separation vessel, a conduit passing from said first liquid-vapor separation vessel which divides into two branches that recommunicate with each other to again form a single conduit which passes to said second liquid-vapor separation vessel, one of said branches passing through said first heat exchanger and the other of said branches passing through said second heat exchanger, said branched conduit being used to pass fluid from said first liquid-vapor separation vessel to said first and second heat exchangers and then to said second liquid-vapor separation vessel, a throttle for isenthalpically expanding vapor from said second liquid-vapor separation vessel, a conduit communicating between said second liquid-vapor separation vessel and said throttle for passing vapor from said second liquid-vapor separation vessel to said throttle, a conduit communicating between said throttle and said second heat exchanger for passing expanded vapors from said throttle to said second heat exchanger, a second throttle, a conduit communicating between said second throttle and said second liquid-vapor separation vessel and said second throttle for passing liquid from said second liquid-vapor separation vessel to said second throttle, a conduit communicating between said second throttle and said first heat exchanger for passing expanded liquid from said throttle to said first heat exchanger and a conduit communicating between said second liquid-vapor separation vessel and said fractionation column for passing liquid from said second liquid-vapor separation vessel to said fractionation column.

6. Apparatus for the removal of hydrogen and methane from a mixture containing the same and ethylene which comprises in combination a fractionation column, means for introducing said mixture into said fractionation column, means for withdrawing a bottoms fraction containing ethylene from said fractionation column, a first separation vessel, means for withdrawing a vaporous overhead fraction from said fractionation column, means for cooling and partially condensing the overhead fraction from said fractionation column, means for passing the cooled and partially condensed overhead fraction to said first separation vessel, means for passing liquid from said first separation vessel to said fractionation column, a second separation vessel, indirect heat exchange means for cooling and partially condensing vapors from said first separation vessel, means for passing vapors from said first separation vessel to said heat exchange means, means for passing cooled and partially condensed vapors from said heat exchange means to said second separation vessel, means for passing liquid from said second separation vessel to said fractionation column, a first expansion means for expanding and thereby cooling vapor from said second separation vessel, means for passing vapors from said second separation vessel to said first expansion means, a third separation vessel, means for passing expanded vapor from said first expansion means to said third separation vessel, means for withdrawing liquid from said third separation vessel, means for passing vapor from said third separation vessel to said heat exchange means, a second expansion means for expanding and thereby at least partially vaporizing and cooling liquid from said second separation vessel, means for passing liquid from said second separation vessel to said second expansion means and means for passing expanded liquid from said second expansion means to said heat exchange means.

7. Apparatus for the removal of hydrogen and methane from a mixture containing the same and ethylene which comprises in combination a first fractionation column, means for introducing said mixture into said first fractionation column, a second fractionation column, conduit means communicating between the lower portion of said first fractionation column and the upper portion of said second fractionation column for passing liquid from said first fractionation column to said second fractionation column, conduit means communicating between the upper portion of said second fractionation column and the lower portion of said first fractionation column for passing vapor from said second fractionation column to said first fractionation column, means for withdrawing a bottoms fraction containing ethylene from said second fractionation column, a first separation vessel, means for withdrawing a vaporous overhead fraction from said first fractionation column, means for cooling and partially condensing the overhead fraction from said first fractionation column, means for passing the cooled and partially condensed overhead fraction to said first separation vessel, means for passing liquid from said first separation vessel to said first fractionation column, a second separation vessel, indirect heat exchange means for cooling and partially condensing vapors from said first separation vessel, means for passing vapor from said first separation vessel to said heat exchange means, means for passing cooled and partially condensed vapors from said heat exchange means to said second separation vessel, means for passing liquid from said second separation vessel to said fractionation column, a first expansion means for expanding and thereby cooling vapor from said second separation vessel, means for passing vapor from said second separation vessel to said first expansion means, a third separation vessel, means for passing expanded vapor from said first expansion means to said third separation vessel, means for withdrawing liquid from said third separation vessel, means for passing at least a portion of the vapor from said third separation vessel to said heat exchange means, a second expansion means for expanding and thereby at least partially vaporizing and cooling liquid from said second separation vessel, means for passing liquid from said second separation vessel to said second expansion means and means for passing expanded liquid from said second expansion means to said heat exchange means.

8. The apparatus of claim 7 where said first fractionation column, said first separation vessel, said second separation vessel and said third separation vessel are contained in a single vertical structure and where the elements named are from bottom to top.

9. A process for separating a multi-component mixture of vaporizable material into a low-boiling fraction and a high-boiling fraction which comprises passing said mixture to a fractionation zone, withdrawing a liquid high-boiling fraction from the lower portion of said fractionation zone, withdrawing a vaporous overhead fraction from said fractionation zone at superatomspheric pressure, cooling the withdrawn overhead fraction whereby it is partially condensed, passing the cooled overhead fraction to a separation zone to form a liquid phase and a vapor phase, therein, passing liquid from the separation zone to the fractionation zone, withdrawing a vaporous fraction from the separation zone, obtaining condensate from the vaporous fraction of the separation zone, indirectly contacting condensate obtained from the vaporous fraction of the separation zone at a reduced pressure with vaporous fraction from the separation zone thereby cooling and partially condensing the same and passing condensate thus formed to the fractionation zone.

10. A process according to claim 9 in which said multi-component mixture comprises ethylene, methane, and hydrogen, said liquid high-boiling fraction comprises ethylene, and said vaporous overhead fraction comprises methane and hydrogen.

11. A process for separating a multi-component mixture of vaporizable material into a low-boiling fraction and a high-boiling fraction which comprises passing said mixture to a fractionation zone, withdrawing a liquid high-boiling fraction from the lower portion of said fractionation zone, withdrawing a vaporous low-boiling fraction from the upper portion of said fractionation zone at superatmospheric pressure, expanding at least a portion of said vaporous low-boiling fraction thereby lowering its temperature, passing thus expanded vapors in indirect heat exchange with unexpanded vapors from the fractionation zone to cool and partially condense said unexpanded vapors, passing at least a portion of the condensate thus formed to said fractionation zone, obtaining condensate from said vaporous low-boiling fraction, passing condensate obtained from said vaporous low-boiling fraction at a reduced pressure in indirect heat exchange with unexpanded vapors of the fractionation zone to cool and partially condense said unexpanded vapors and passing at least a portion of the condensate thus formed to said fractionation zone.

12. In a process for the production of ethylene in which a product is obtained containing ethylene, methane and hydrogen, the method of removing hydrogen and methane from said mixture which comprises passing said mixture to a fractionation zone, withdrawing a liquid high-boiling fraction containing ethylene from the lower portion of said fractionation zone, withdrawing a vaporous overhead fraction from the fractionation zone at an elevated pressure, cooling the withdrawn overhead fraction whereby it is partially condensed, passing the cooled overhead fraction to a separation zone to form a liquid phase and a vapor phase therein, passing liquid from the separation zone to the fractionation zone, withdrawing a vaporous fraction containing methane and hydrogen from the separation zone, expanding a portion of the vaporous fraction from the separation zone thereby lowering its temperature, passing thus expanded vapors in indirect heat exchange with unexpanded vapors from the separation zone to cool and partially condense said unexpanded vapors, passing at least a portion of the condensate thus formed to said fractionation zone, obtaining condensate from the vaporous fraction of the separation zone, passing condensate at a reduced pressure obtained from the vaporous fraction of the separation zone in indirect heat exchange with unexpanded vapors from the separation zone to cool and partially condense said unexpanded vapors and passing at least a portion of the condensate thus formed to said fractionation zone.

13. A process for separating a multi-component mixture of vaporizable material into a low-boiling fraction and a high-boiling fraction which comprises passing said mixture to a fractionation zone, withdrawing a liquid high-boiling fraction from the lower portion of said fractionation zone, withdrawing a vaporous overhead fraction from said fractionation zone at superatmospheric pressure, cooling the withdrawn overhead fraction whereby it is partially condensed, passing cooled overhead fraction to a first separation zone to form a liquid phase and a vapor phase therein, passing liquid from the first separation zone to the fractionation zone, withdrawing and cooling vaporous fraction from the first separation zone whereby a portion thereof is condensed, passing the thus cooled fraction of the first separation zone to a second separation zone to form a liquid phase and a vapor phase therein, passing liquid from the second separation zone to the fractionation zone, withdrawing a vaporous fraction from the second separation zone at an elevated pressure, expanding vaporous fraction from the second separation zone thereby lowering its temperature to below that of the vaporous fraction withdrawn from the first separation zone, separating expanded vaporous fraction from the second separation zone into a liquid fraction and a vapor fraction in a third separation zone, indirectly heat exchanging expanded vaporous fraction from the third separation zone with vaporous fraction of the first separation zone thereby cooling and partially condensing the same, passing condensate thus formed to the second separation zone, passing liquid withdrawn from said third separation zone in indirect heat exchange with vaporous fraction of the first separation zone thereby cooling and partially condensing the same and passing condensate thus formed to the second separation zone.

14. A process according to claim 13 in which said multi-component mixture contains ethylene, methane and hydrogen, said liquid high-boiling fraction contains ethylene and said vaporous fraction from said third separation zone contains methane and hydrogen.

15. A process according to claim 14 in which a portion of the vaporous fraction of the first separation zone is cooled and partially condensed in the first-mentioned heat exchange step, the balance of the vaporous fraction of the first separation zone is cooled and partially condensed in the last-mentioned heat exchange step and all of the liquid fraction of the second separation zone is passed to the fractionation zone.

16. A process according to claim 14 in which a portion of the liquid fraction from the second separation zone is expanded to lower its temperature to below that of the vaporous fraction withdrawn from the first separation zone, at least a portion of the thus expanded fluid is passed in indirect heat exchange with vaporous fraction of the first separation zone thereby cooling and partially condensing the same and passing condensate thus formed to the second separation zone.

17. In a process for the production of ethylene in which a product is obtained containing ethylene, methane and hydrogen, the method of removing hydrogen and methane which comprises passing said product to a fractionation zone maintained at a superatmospheric pressure, withdrawing a liquid high-boiling fraction containing ethylene from the lower portion of said fractionation zone, withdrawing an overhead fraction from said fractionation zone, cooling and partially condensing said overhead fraction from said fractionation zone, passing said cooled and partially condensed fraction to a first separation zone to form a liquid phase and a vapor phase therein, passing liquid from said first separation zone to the upper portion of said fractionation zone, withdrawing vapor from said first separation zone and cooling said withdrawn vapor thereby partially condensing the same, passing said cooled and partially condensed vapor of the first separation zone to a second separation zone to form a liquid phase and a vapor phase therein, passing liquid from the second separation zone to the upper portion of the fractionation zone, withdrawing vapor containing hydrogen and methane from the second separation zone at a superatmospheric pressure, expanding vapor from the second separation zone thereby reducing its temperature, passing said expanded vapor to a third separation zone maintained at a temperature lower than that of said first separation zone, passing vapor from said third separation zone in indirect heat exchange with vapor from said first separation zone to accomplish a part of the aforesaid cooling thereof, passing liquid from said second separation zone to a fourth separation zone maintained at a temperature lower than that of the first separation zone and a pressure sufficiently low so that liquid from the second separation zone is partially vaporized by reduction in pressure and thereby cooled, passing vapor from the fourth separation zone in indirect heat exchange with vapor of the first separation zone to accomplish another part of the aforesaid cooling thereof and passing liquid from the fourth separation zone in indirect heat exchange with vapor of the first separation zone to accomplish still another part of the aforesaid cooling thereof.

18. Apparatus for the removal of hydrogen and methane from a mixture containing the same and ethylene which comprises in combination a fractionation column, means for introducing said mixture into said fractionation column, means for withdrawing a bottoms fraction containing ethylene from said fractionation column, a first separation vessel, means for withdrawing a vaporous overhead fraction from said fractionation column, means for cooling and partially condensing overhead fraction from said fractionation column, means for passing the cooled and partially condensed overhead fraction to said first separation vessel, means for passing liquid from said first separation vessel to said fractionation column, a second separation vessel, indirect heat exchange means for cooling and partially condensing vapors from said first separation vessel, means for passing vapors from said first separation vessel to said heat exchange means, means for passing cooled and partially condensed vapors from said heat exchange means to said second separation vessel, means for passing liquid from said second separation vessel to said fractionation column, expansion means for expanding and thereby cooling vapor from said second separation vessel, means for passing vapors from said second separation vessel to said expansion means, a third separation vessel, means for passing expanded fluid from said expansion means to said third separation vessel, means for passing liquid from said third separation vessel to said heat exchange means and means for passing vapor from said third separation vessel to said heat exchange means.

19. Apparatus according to claim 18 in which said expansion means is an expansion engine.

20. The apparatus of claim 3 in which said fractionation column, said first liquid-vapor separation vessel, and said second liquid-vapor separation vessel are supported in a single vertical structure in which the elements named are stacked in the order named from bottom to top.

21. A process for separating a multi-component mixture of vaporizable material into a low-boiling fraction and a high-boiling fraction which comprises passing said mixture to a fractionation zone, withdrawing a vaporized low-boiling fraction from the upper portion of said fractionation zone at superatmospheric pressure, superheating at least a portion of said withdrawn low-boiling fraction by indirect heat exchange with fluid from said fractionation zone, said fluid being at a higher temperature than said low-boiling fraction at the point of its withdrawal from said fractionation zone, expanding at least a portion of said superheated portion thereby lowering its temperature to below that of the vaporized low-boiling fraction withdrawn from the fractionation zone, passing at least a portion of said expanded portion in indirect heat exchange with unexpanded vapors from the fractionation zone to cool and partially condense said unexpanded vapors and passing at least a portion of the condensate thus formed to said fractionation zone.

References Cited in the file of this patent

UNITED STATES PATENTS

| | | |
|---|---|---|
| 2,534,903 | Etienne | Dec. 19, 1950 |
| 2,583,090 | Cost | Jan. 22, 1952 |
| 2,600,494 | Ferro | June 17, 1952 |
| 2,813,920 | Cobb | Nov. 19, 1957 |

UNITED STATES PATENT OFFICE
CERTIFICATE OF CORRECTION

Patent No. 3,111,402              November 19, 1963

Frederick C. Cunningham

It is hereby certified that error appears in the above numbered patent requiring correction and that the said Letters Patent should read as corrected below.

Column 7, line 13, for "zone" read -- stage --; column 13, Table VIII, third column, line 9 thereof, for "150" read -- 105 --; column 16, line 50, for "vensel" read -- vessel --.

Signed and sealed this 7th day of July 1964.

(SEAL)
Attest:

ERNEST W. SWIDER
Attesting Officer

EDWARD J. BRENNER
Commissioner of Patents